United States Patent [19]

Kollross

[11] Patent Number: 4,847,951
[45] Date of Patent: Jul. 18, 1989

[54] PROCESS AND DEVICE FOR SEGMENTING A LENGTH OF SAUSAGE, PRODUCED IN AN AUTOMATIC FILLING MACHINE, INTO A PLURALITY OF SAUSAGES SEPARABLE OR SEPARATED FROM ONE ANOTHER

[76] Inventor: Gunter Kollross, AM Wallerstadter Weg 20, D-6080 Grob Berau-Dornheim, Fed. Rep. of Germany

[21] Appl. No.: 155,723

[22] PCT Filed: May 23, 1987

[86] PCT No.: PCT/EP87/00270
§ 371 Date: Jan. 22, 1988
§ 102(e) Date: Jan. 22, 1988

[87] PCT Pub. No.: WO87/07115
PCT Pub. Date: Dec. 3, 1987

[30] Foreign Application Priority Data

May 24, 1986 [DE] Fed. Rep. of Germany ....... 3617559

[51] Int. Cl.$^4$ ............................................. A22C 11/00
[52] U.S. Cl. .......................................... 17/33; 17/41
[58] Field of Search ............................... 17/33, 34, 41; 53/138 A, 138 R

[56] References Cited

U.S. PATENT DOCUMENTS

| | | | |
|---|---|---|---|
| 3,191,222 | 6/1965 | Townsend | 17/33 |
| 3,214,883 | 11/1965 | Omori | 53/138 A X |
| 3,587,204 | 6/1971 | George | 53/138 A |
| 3,672,001 | 6/1972 | Greider | 17/33 |
| 4,675,945 | 6/1987 | Evans et al. | 17/41 X |

Primary Examiner—Willis Little
Attorney, Agent, or Firm—Larson and Taylor

[57] ABSTRACT

A device for automatically calibrating sausages (18) produced on an automatic sausage filling apparatus (10), from whose filling pipe a casing material (14) of limited elasticity is drawn by a separating device (20) with adjustable braking force, characterized according to the invention in that the separating device (20) is fitted with a drive (32, 34, 36, 38, 40) for adjusting the braking power thereof and that in front of the mouth of the filling pipe is arranged a measuring instrument (42) for continuously measuring sausage calibre and for producing sausage of consistent size, which can be brought to a control unit (58) for comparison with a reference calibre for the sausage in order to produce a regulated size for the adjustment drive. The device according to the invention also resolves large and frequent variations in the volume which is a function of the sausage caliber by maintaining the produced sausages at a constant filled weight.

16 Claims, 10 Drawing Sheets

PROCESS AND DEVICE FOR SEGMENTING A LENGTH OF SAUSAGE, PRODUCED IN AN AUTOMATIC FILLING MACHINE, INTO A PLURALITY OF SAUSAGES SEPARABLE OR SEPARATED FROM ONE ANOTHER

The invention relates to a method for sectioning into a great number of separable or separated sausages a length of sausage produced by an automatic filling apparatus which involves intermittently filling a sausage casing tube drawn away from the filling pipe of the automatic filling apparatus by a casing brake, which sausage casing tube is constricted during filling pauses by displacement implements located directly in front of the mouth of the filling pipe and sealed by setting at a distance from each other two clips from any type of replenishable clip supply by means of fastening implements arranged on the displacement implements while a division point lying therebetween develops, and if necessary is severed at the division point, whereby the constriction first develops along a narrowly bounded length of sausage string and by means of the axial separation of the displacement implements is stretched across the distance separating the clips, as well as a device to implement the method.

Such a method, or rather, a device for its implementation, is used to produce small to medium sized sausage strings, in which the individual sausages are relatively short. During processing of individual sausages casings, therefore, the down times required for readying a new casing on the filling pipe after every filling and closing sequence significantly reduces the productivity of the system.

The production of sausage strings by the method first mentioned, however, poses other problems that have not as yet been satisfactorily addressed. The uninterupted delivery of fastening clips to the fastening implements in particular engenders conditions that limit the size of the clip supply and necessitate frequent shutdowns for refilling.

Another problem is created when new sausage casings are fitted onto the filling pipe; this necessitates lengthy down times in order to permit the machine attendant to carefully draw new casing over the filling pipe.

The objective of the invention is the further elimination of down times in sausage string production, or at least reduction thereof, with a view to significantly increasing efficiency in sausage string production.

The invention satisfies these objectives in that the clip dispensers form an integral part of the machine and that during the filling phase occuring prior to constriction and fastening, both clips are separated from the clip supplies and when the displacement implements are separating, are positioned in front of the fastening implements at an angle to the direction in which the clips are set.

The method according to the invention, by means of a built-in clip dispensing system, permits the delivery of as many clips as required without interrupting the filling and separation phases, whereby during axial separation the performance of the displacement and fastening implements is not hindered by the size of the clip dispensers, which permits the displacement and fastening implements to operate at higher speeds. In this connection, placing the clips during the filling phase advantageously enables the leading clip (the rear closing clip of the thus formed sausage) in the processing direction of the sausage casing tube to be positioned before the constriction is stretched, following which the constriction is stretched by the displacement and fastening implements for this clip as they move away from the filling pipe while the displacement and fastening implements for the second clip (the forward closing clip of the sausage to be completed in the next cycle) remain fixed in place. The prior placement of the leading clip ensures that, when the constriction is stretched, sausage filling is not forced into the already filled sausage string to cause an overpressure that can lead to bursting. The constriction is stretched to a greater extent in the direction of the filling pipe if additional tubular casing material is removed, whereby the lead clip serves as a stop to prevent the sausage filling from shifting into the string of filled casing casing tubes. Free execution of this procedure requires at least that the lead clip be placed such that the ends of its shanks overlap. It is also advisable in this regard that when the clips having overlapping shank ends are set in place, their structural portions enclose such an angle with the radial cross plane of the sausage string, that the planes in which the overlapping shank ends lie are oriented vertically to the axis of the sausage string. Thus is ensured that, during separation, the shank ends will not dig into the sausage string and damage it.

In another embodiment of the method according to the invention, the displacement and fastening implements, after the tubing drawn from the filling pipe has been consumed, are transported by the casing brake into a position wherein the filling pipe is freed, which permits a new sausage casing supply occupying the previously mentioned open space to be brought into a position flush with the filling pipe, which sausage casing supply is drawn over the filling pipe when the displacement and fastening implements return to the work position. These embodiment features ensure the reduction of down time required for filling pipe replenishement and reduce the involvement of attending personnel.

An apparatus for the implementation of the method according to the invention with a casing brake and two pairs of contrarily actuated V-shaped displacement implements, to each of which is assigned a fastening device, whereby both pairs of displacement implements are moveable in relation to each other in the direction of the sausage string, characterized according to the invention in that the fastening implements consisting in a known manner of stamps that can be actuated by sliding and of immobile dies, form an integral part of the displacement implements and the displacement implements comprising the stamps feature channels oriented at an angle to the sliding direction of the stamps, through which, while the displacement implements are opened but not separated, an individual fastening clip can be transferred from the built-in magazine to the operating path of the fastening stamp.

According to a first embodiment feature of the device according to the invention, the stamps and dies of the fastening device designed to place the clips are designed with overlapping shank ends and are turned through such an angle to a plane oriented radially across the string of sausages, that the planes in which the overlapping shank ends lie, are perpendicular to the axis of the sausage string. This dictates that the clips also are turned through the angle mentioned and positioned in front of the stamps of the fastening implements and that the above-mentioned channels are bent at their ends.

According to another embodiment feature of the device according to the invention, when the displacement implements are opened and not separated, built-in guides connect flush to the channels therein comprised, into each of which fits the leading fastening clip of a row of clips that can be pushed at an angle thereto, and to each guide is assigned a pushing mechanism actuated by a controllable motor, by the aid of which pushing mechanism the lead fastening clip can be separated from the row of clips and transported through the guide and the channel into the fastening stamp path.

Yet another embodiment feature of the invention ensures that the fastening stamp is actuated by means of hydraulic power cylinders rigidly attached to the displacement implements.

According to a distinctive feature of the advantageous embodiment of the device according to the invention, the displacement implements are controllable by cam wheels so designed that the displacement implements during constriction are maintained in an upright or constricted position through a greater turning angle or dwell time, and to the cam wheels are immovably attached radial cams, by means of which the separation of the displacement implements can be regulated when the latter are in the constriction position and the fastening implements can be actuated. With the aid of such cam wheels and radial cams, the individual operating phases can be caused to follow each other smoothly at appropriate intervals, whereby it is particularly advantageous if to the cam wheels is rigidly attached a further radial cam capable of regulating a reduction in the turning speed of the cam wheels when the displacement implements occupy the constriction position. This allows adequate time for stretching the constriction and positioning both fastening clips independently of their temporal spacing before or after stretching or immediately after stretching.

For this purpose, cam wheels and radial cams are arranged upon a common shaft, which, after every filling procedure, can be turned 180° by a controlled electric or hydraulic motor.

It is furthermore necessary that the cam wheels be produced from circular discs upon whose mutually opposed frontal sides are arranged control grooves to guide the ends of the control pins, by means of which can be actuated one displacement implement of each implement pair. In this connection, both displacement implements of each implement pair are advantageously mounted rigidly upon the control pins and both displacement implements of the other implement pair are mounted so as to be able to slide axially upon the control pins, and included is a controllable separating device for pushing the second implement upon the control pins, which separating device should be actuated by a double-acting hydraulic power cylinder.

Finally, the device according to the invention that is arranged to slide axially in relation to the filling pipe of an automatic sausage filling apparatus and which by means of a sliding drive can be displaced from a work position in which the casing brake fits over the end of the filling pipe and the displacement implements are arranged immediately in front of the mouth of the filling pipe, to a position wherein the filling pipe is freed, possesses a distinguishing characteristic that provides for the attachment to the device of a magazine for sausage casing tubes gathered into the form of a hollow rod as well as a holding device, to which after each shift of the device into the release position a hollow rod can be guided from the magazine, whereby the basic orientation of the holding device to the filling pipe of the automatic filling system is such that, during withdrawal of the device to the work position, the filling pipe travels through the hollow rod and loads itself with the hollow rod.

The invention is described in greater detail by an embodiment example illustrated in the following drawings. Shown are.

Figure 1:
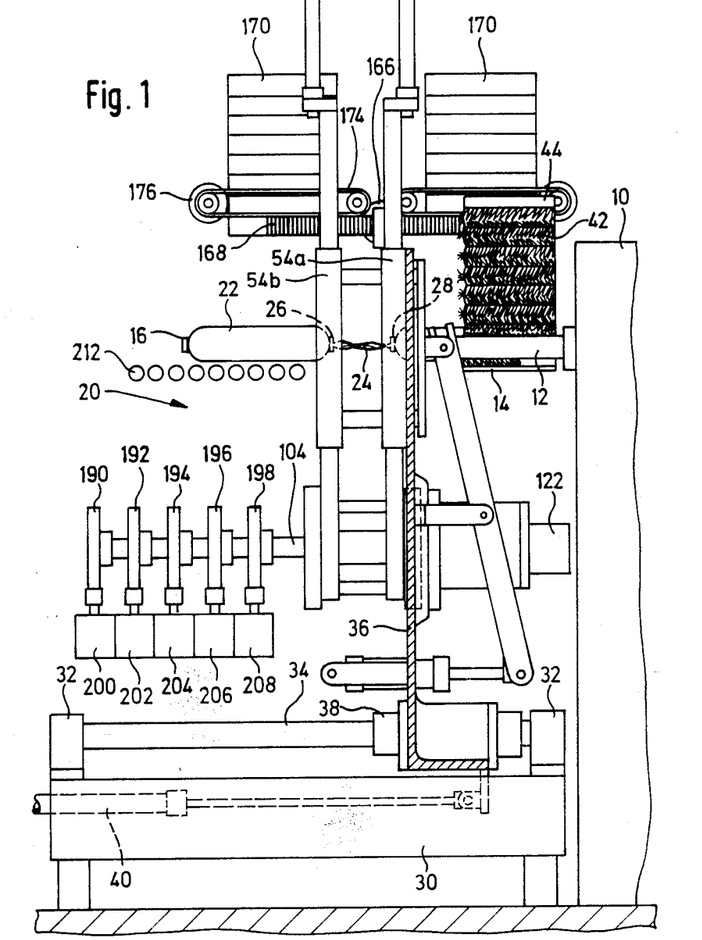
FIG. 1 the portion of the sausage filling machine including the filling pipe, with a device according to the invention in a working position, shown from the side and partly in section, in which a sausage is separated from the following sausage string and fitted with fastening clips, FIG. 2 the same side view of the device in its loading position, in which the slidable part of the device is shifted away from the filling pipe for the purpose of loading the pipe with a new chain of tubes, FIG. 3 a frontal view of the device seen from the automatic filling apparatus, with a row of tubes ready to be accepted by the filling pipe, FIG. 4 the same frontal view as in FIG. 3 at the moment of release of a new chain of tubes to be positioned in front of the filling pipe, FIG. 5 an opposing frontal view of the device with open displacement implements, FIG. 6 the same frontal view as in FIG. 5 with closed displacement implements, FIG. 7 a cross section through the displacement implements according to line VII—VII in FIG. 6 prior to the separation of the displacement implements, FIG. 8 the same cross section as in FIG. 7 after separation of the displacement implements, FIG. 9 a longitudinal section through the centre of a portion of the device with the support for the control shaft and the guide pins that extend into the guide grooves of the cam wheels in order to regulate the movement of the displacement implements, FIG. 10 a horizontal cross section through the main frame of the displacement implements with channels for guiding the fastening clips as well as their guiding mechanism, whereby one clip at a time is positioned underneath the stamp of the fastening device, and FIG. 11 the same cross section as in FIG. 10 with withdrawn positioning pusher and separated displacement implements.
Figure 2:
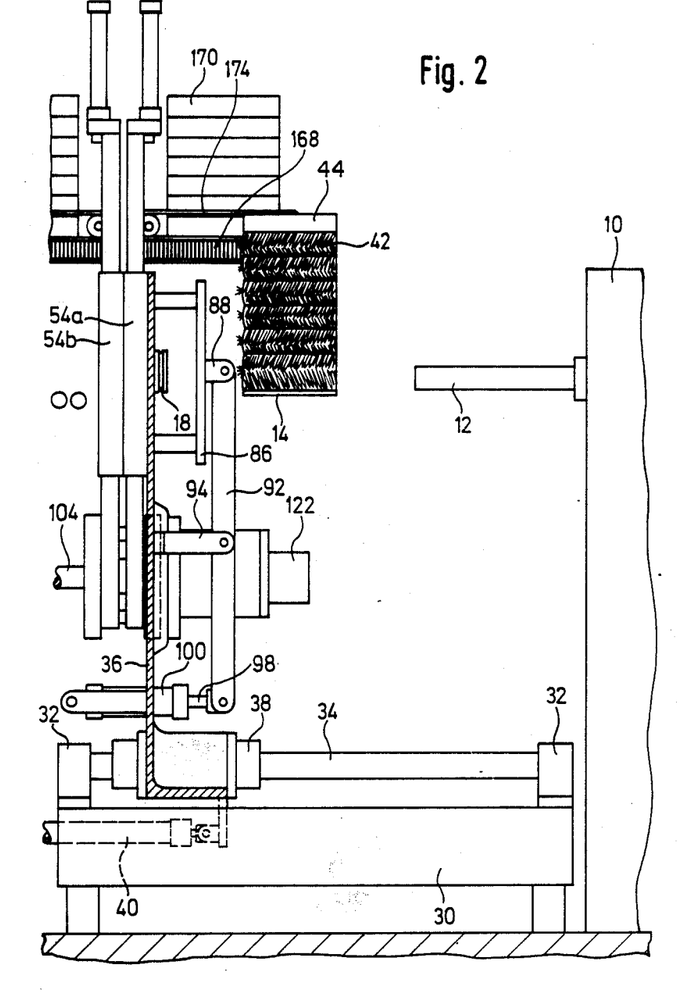

Represented in FIGS. 1 and 2 by the number 10 is an automatic sausage filling apparatus (largely represented in cut-away illustration) - in the trade known also as a "cutter", which in a known manner grinds into sausage stuffing meat fed into it through a (not shown) funnel and which, under pressure expels the same meat through a filling pipe 12. The expulsion of sausage filling through filling pipe 12 can be regulated and may be switched on and off at any time.

The sausage filling expelled from the automatic filling apparatus 10 is introduced in a known manner into a sausage casing, axially gathered into the form of a hollow rod 14 - in the trade known as a "chain of tubes" - and slid onto filling pipe 12, whereby the leading end of the tubular casing is closed by means of a fastening clip 16. When being filled, the sausage casing is restrained by (can be seen only in FIG. 2) casing brake 18 and thus becomes a tightly-packed sausage string separated by means of a separating device designated in its entirety by 20 into a great number of separable or wholly separated sausages 22, as longitudinal constrictions form, whereupon two fastening clips 26, 28 are placed at a distance from each other in order to fasten either the rear extremity of the preceding sausage or the leading or forward extremity of the following sausage, between which clips the sausage string can be separated into sausages 22.

The separating apparatus 20, known in the trade as a "double clipper", has a main box-like frame 30 set on the floor in front of the automatic filling apparatus, in which main frame 30 the (not shown) electric and hydraulic controls, which include an aggregate for producing the hydraulic fluid, are housed. On the upper side of main frame 30 are located two guide rods 34 set at a distance from each other and brought together at consoles 32 and upon which is mounted a rib (not shown)-reinforced support plate 36 capable of sliding with the aid of a ball guide bushing 38. An hydraulic power cylinder 40 allows support plate 36 to slide atop the main frame 30 from a work position shown in FIG. 1 to a loading position shown in FIG. 2, in which filling pipe 12 of automatic filling apparatus 10 is free to be loaded with a new chain of tubes 14.

For the purpose of loading new tube chains 14, support plate 36 carries on its reverse side a magazine 42 shown in FIGS. 1 to 4 which has the form of a flat box tilted at approx. 45°, whose upper end at 44 is open for filling, or rather replenishment with tube chains 14. The stacked tube chains 14 are seized by a double-armed rocking lever 46 and released one at a time to the lower end of the magazine, at which point the lower wall 48 of the box forms a prism with its end wall 50, which prism brings tube chains 14 falling therein into a position axially flush with the filling pipe 12, in which filling pipe 12, during shifting of the support plate 36 into the working position (FIG. 1) grasps the tube chain 14 and loads itself therewith. The rocking lever 46 is swung to and fro between two positions (FIG. 3 and 4) by a double-acting power cylinder 52 whereby it releases each time to the prism 48, 50 a chain of tubes 14 from the pile situated above.

The front end of each tube chain 14, as has already been mentioned above, is closed by means of a clip 16 or by other suitable means and when support plate 36 is advanced to its work position 36 is taken by the end of the filling pipe and drawn through by the above-mentioned casing brake 18. Casing brake 18 is attached to the support plate such that it can be removed and so as to be able to adapt to different filling pipe diameters can be exchanged for larger or smaller casing brakes. The construction and operation of the casing brake are well enough known and need not be explained here.

Obviously, support plate 36 is fitted in the zone of the casing brake 18 with an opening that permits the passage of filling pipe 12 and the tubing material proceding from it.

To periodically produce constrictions 24 in the sausage string during temporary interruptions in the flow of sausage filling from the automatic sausage filling apparatus 10, two identically shaped and mirror-inverted displacement implement pairs 54a, 54b are provided, whose manner of construction can be identified in FIGS. 1 and 2 as well as FIGS. 5 to 8.

Each pair of displacement implements consists of a main frame 56 and an auxiliary frame 58 slidable therein. The auxiliary frame 58 is entirely of solid construction, whereas the main frame 56 is covered with sheets 60, 62 between which the auxiliary frame 58 is situated.

The sheets 60, 62 of the main frame 56 on one side and the auxiliary frame 58 on the other form the individual implements of each pair of displacement implements and to this end are fitted with V-forming slopes 64, or 66, which in projecting vertically to the plane of the frame 56, 58 form the boundary of an essentially rhomboidal passage 68 (FIG. 5), the upper and lower corners of which are provided with semicircular recesses 70 and 72 in the apex zones of the V-formed slopes 64 and 66, respectively. When frames 56, 58 are shifted, rhomboidal passage 68 is reduced to a lower dimension (FIG. 6) defined by the two semicircular recesses 70, 72 only.

Figure 7:
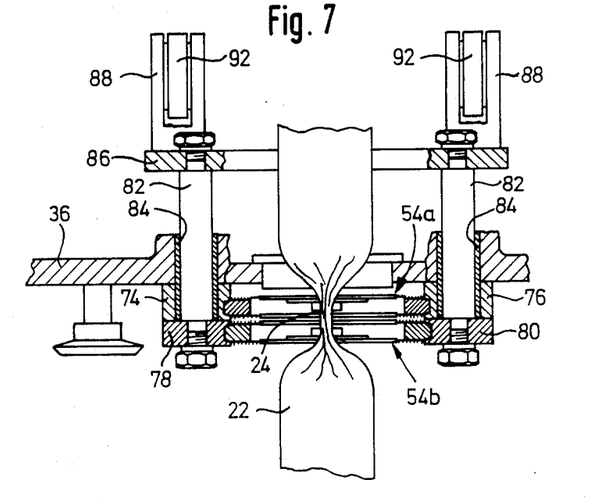
Figure 8:
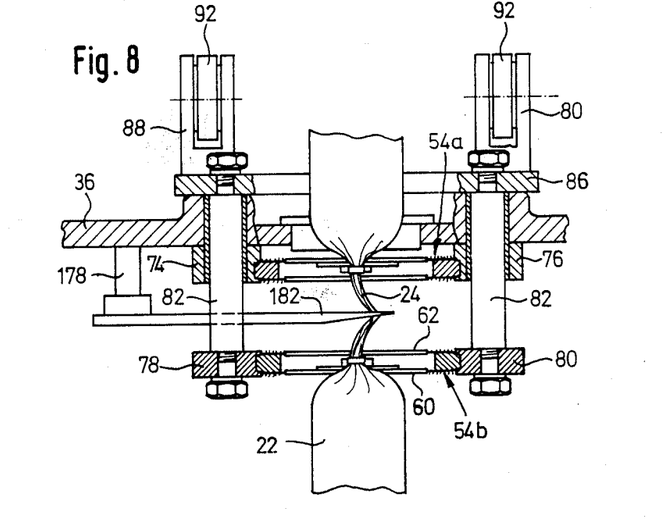

The main frame 56 of the pair of displacement implements 54a, as can be inferred from FIGS. 7 and 8, is guided so as to be able to slide vertically between slotted blocks 74, 76 made of a low-friction plastic such as polyfluortetraethylene and fixed to the dividing wall 36. Block 74 has a relatively long construction, whereas on the other side two short blocks 76 spatially separated vertically, guide the main frame 56, in order, if necessary, to permit the delivery of sausage casing tubes to the displacement implements.

Figure 3:
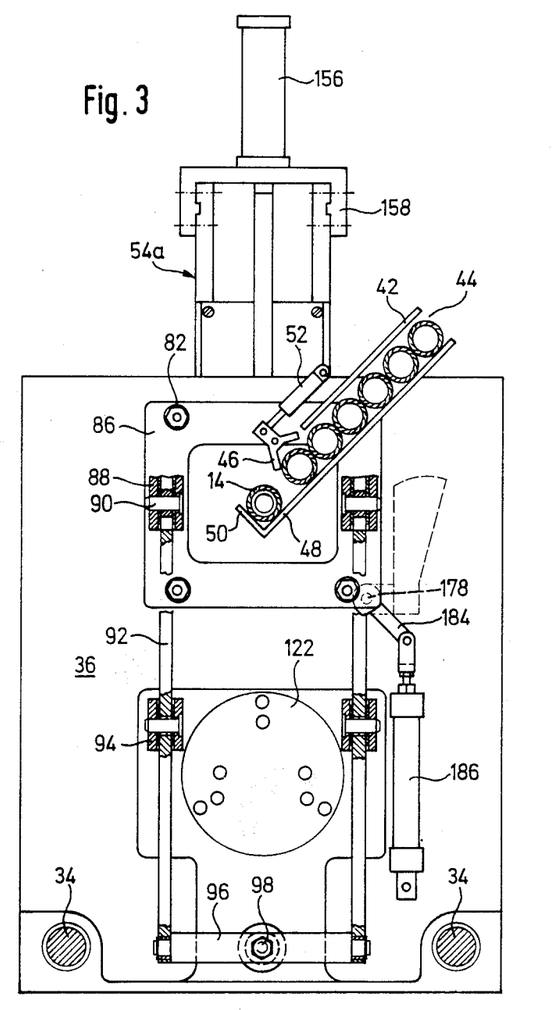
Figure 4:
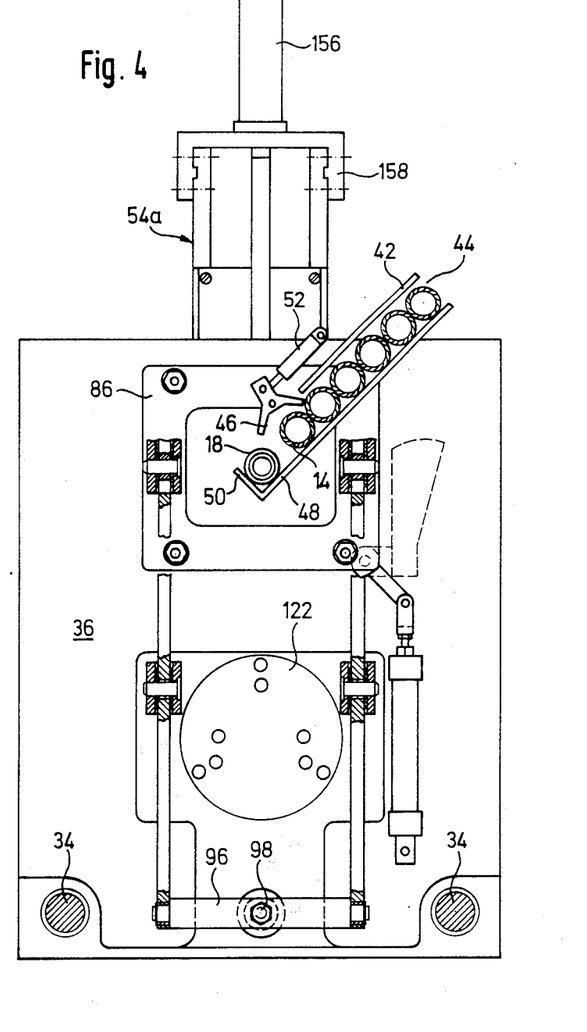

In a similar manner, the main frame 56 of the second pair of displacement implements 54b is guided between slotted blocks 78, 80 fixed at one end to one of the guide rods 82 that are arranged one atop the other. The guide rods 82 occupy and can slide inside lined bores 84 of support plate 36 and inside blocks 74, 76 and are fastened at their other ends to a frame-shaped pressure plate 86 (FIGS. 3 and 4). The vertical legs of pressure plate 86 support pillow blocks 88 with journals 90 that are surrounded by the slotted upper ends of two double-armed drive levers 92, the latter being supported at their centres on support plate 36 by bearing consoles 94 and at their lower ends connected by a transverse rod 96 attached so as to be able to turn, onto which the piston rod 98 of a double acting hydraulic power cylinder 100 fits, whose housing is attached to support plate 36 by means of flaps 102 so as to be able to swing thereupon, the latter being notched in the zone of power cylinder 100.

The in-and-out travel of power cylinder 100 causes displacement implement pairs 54a, 54b to separate, whereby implement 54a remains fixed to support plate 36, while implement pair 54b moves away from supporting plate 36.

Figure 9:
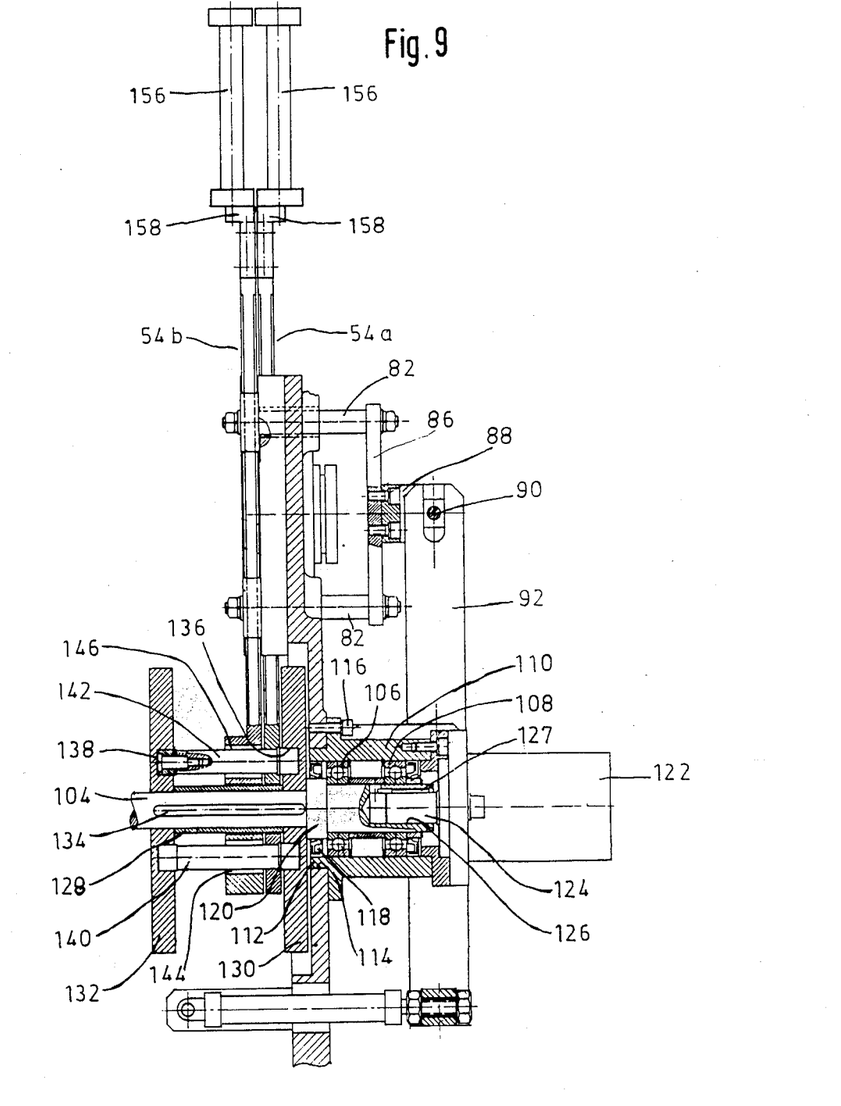
Figure 10:
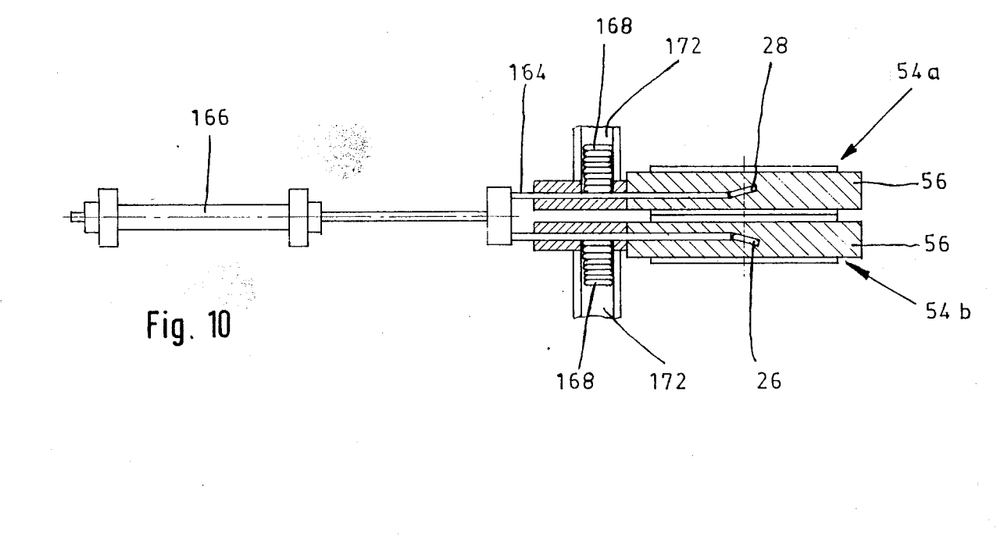
Figure 11:
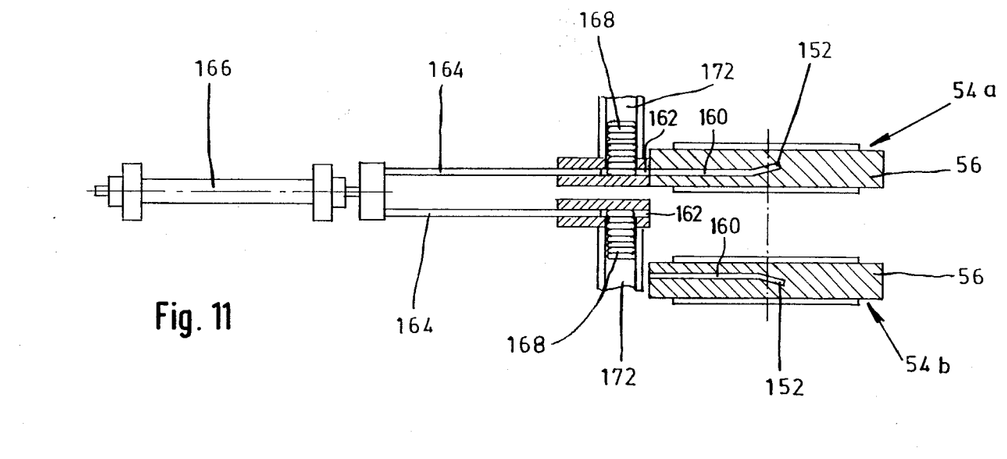

Serving to control the vertical constriction movements of frames 56, 58 of both displacement implement pairs 54a, 54b, is a control shaft 104 (FIG. 9) borne by ball bearings 106, 108 inside a bearing housing 110, the latter fitting through a collar 112 into a bore 114 of support plate 36 and attached to the support plate by screws 116. Collar 112 comprises an annular lip seal 118 that forms a seal against a shoulder 120 of control shaft 104. At the opposite end of bearing housing 10 is a flange-mounted hydraulic motor 122 whose driving shaft 124 fits into a centred bore 126 of control shaft 104 and connected to the latter by a spline 127 so as to prevent its rotational movement.

Figure 5:
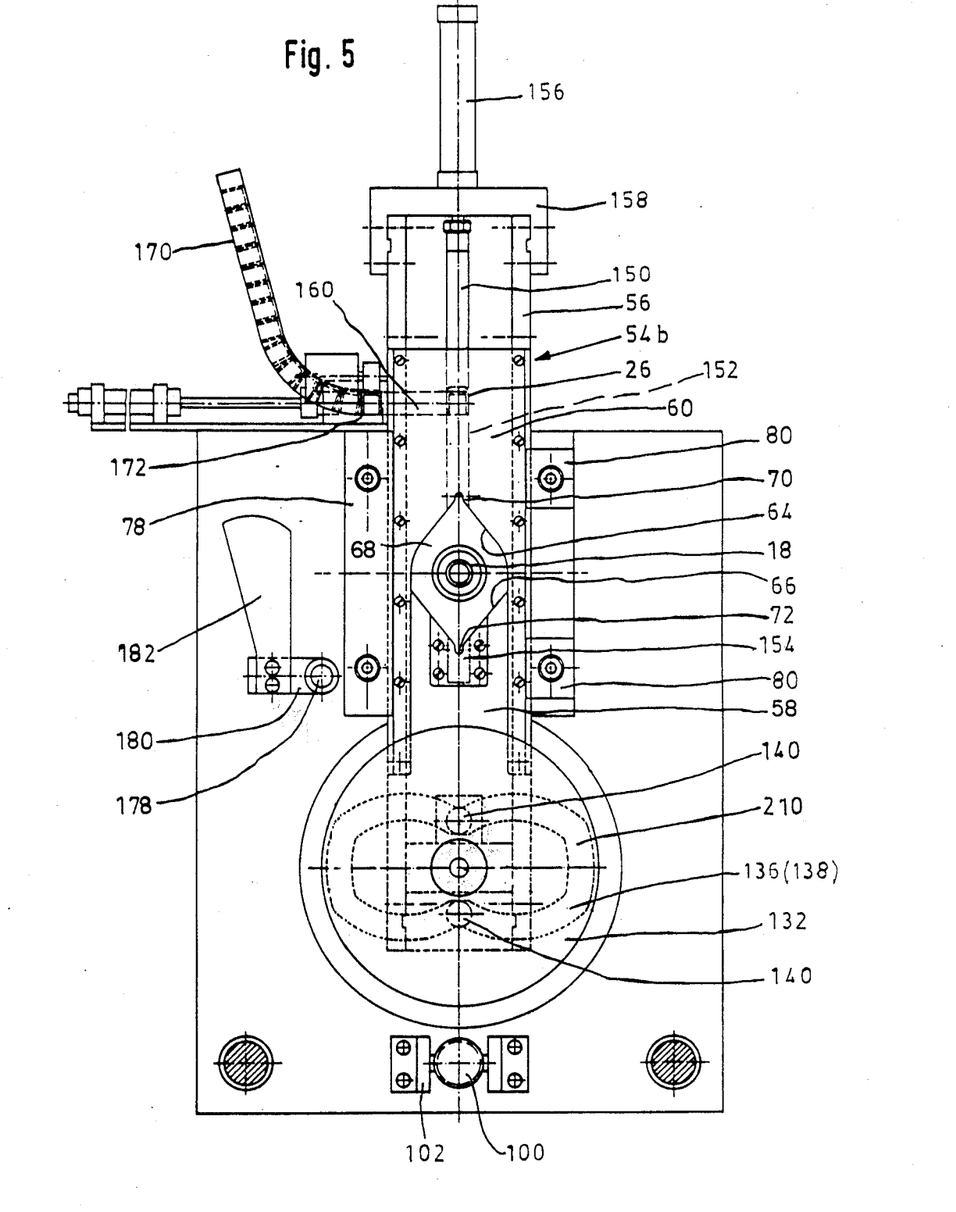
Figure 6:
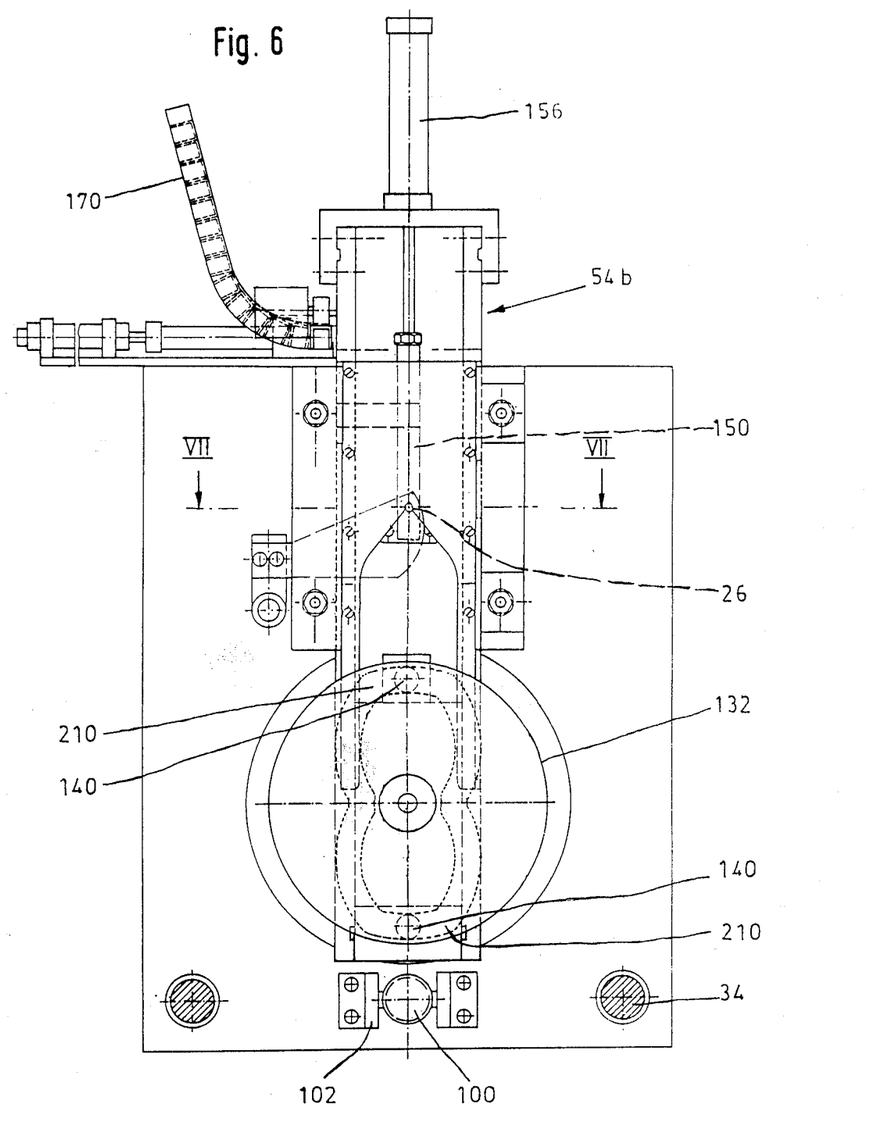

On the other side of shoulder 120 are slid over control shaft 104 two cam wheels 130, 132 that are rigidly attached to each other by a sleeve 128 and connected to shaft 104 by means of a spline 134 in order to prevent relative rotation. The cam wheels comprise on their opposed facing sides control grooves 136, 138 that align with each other, which control grooves, as can be seen in FIGS. 5 and 6, approach the form of a figure "eight" in that they consist of two mirror-inverted horseshoe shaped sections. The circumferences of radial cams 136, 138 have the same thickness throughout and accomodate the ends of two control pins 140, 142 arranged one above the other, of which the lower control pin 140 is fixed immovably and unturnably in a bore of the main frame 56 of the displacement shear pair 54a and the upper control pin 142 is fixed immovably and unturnably in a bore of the related auxiliary frame 58. Control pins 140, 142 continue to extend into frames 56, 58 of the second displacement implement pair 54b through bores fitted with sliding bushings 144, 146, and thus, while the displacement implement pairs are separating, enable the latter to slide with the aid of the power cylinder 100.

The dimensions of the "figure eight" shaped guide grooves 136, 138 are such that in the position shown in FIG. 5, in which the control pins 140, 142 sit beside control shaft 104, displacement implement pairs 54a, 54b are opened when the fully rhomboidal passage 68 is formed and in the position shown in FIG. 6, in which the control shaft 104 and the cam wheels 130, 132 are turned 90° in relation to FIG. 5 and control pins 140, 142 are situated at the greatest distance from control shaft 104, displacement implement pairs 54a, 54b are closed for a dwell time when the passage is reduced to the lower limit size defined by the semicircular recesses 70, 72. In order to close and reopen the displacement implement pairs 54a, 54b, it is necessary for the control shaft 104 to revolve half a turn, and the hydraulic motor 122 can be actuated in such a way that whenever the motor switches on, the cam wheels are turned exactly 180° from the position indicated in FIG. 5 through the position shown in FIG. 6 to return to the position indicated in FIG. 5, whereupon the motor momentarily stops.

Forming an integral part of each displacement implement pair 54a, 54b is a fastening device for setting the fastening clips 26, 28. Such fastening devices consist essentially of a stamp 150 that acts as a male mould, which is guided between sheets 60, 62 of the main frame along guide path 152 that ends in a semicircular recess 70, and a female mould 154 fixed to the auxiliary frame 58 and situated directly underneath the semicircular recess 72. Guide path 152 is incorporated into a plate-shaped section of main frame 56 and features a flat cross section corresponding to stamp 150, or, rather to the fastening clips, which cross section is bent in relation to the longitudinal axis of guide path 152 at a slight angle to the plane of the frame. This angle is defined by the relationship between the thickness of the clip material and the width of the fastening clip, the fastening clips being moved by stamp 150 downwards through the guide path with their shank ends, which, in relation to the longitudinal direction of the sausage string being set off from each other by the thickness of the material forming the clip, strike against the female mould fitted with grooves that lie directly adjacent each other so that the clip shanks can be bent towards each other, whereby these grooves run exactly parallel to the plane of the frames 56, 58.

The driving force for the stamps 150 is provided by hydraulic power cylinders 156 fixed to the end portions 158 of the main frames 56 and connected to the hydraulic control system by not-illustrated flexible lines. In order to feed the fastening clips 26, 28 in front of stamps 150, frames 56 of displacement shear pairs 54a, 54b are equipped with channels 160 running at an angle to the guide paths 152, which channels join guide paths 152. The channels 160 are open on each longitudinal side of each of the main frames 56 and when the displacement implements 54a, 54b are open and unseparated, align with guides 162 fixed to the support plate 36, in each of which guides can be slid a pusher 164 by means of a common double-acting power cylinder 166. The length of the pusher 164 and the stroke length of the power cylinder 166 allow the pushers to shove a fastening clip set in front of them and outside of the channels 160 into the guides 162 from the position of the displacement implements 54a, 54b already described, into the guide paths 152 of the main frames 52 and are thus able to position them in front of stamp 150.

The clips 28, 30 are transferred in the form of known clip rows 168 from magazines into the guides 162 by means of guide channels 172 with the aid of endless friction belts 174 driven in opposing directions by electric motors 176.

Housed in support plate 36 and outside of the zone of displacement implements 54a and guide blocks 74, is a shaft 178 that projects beyond both sides of support plate 36 and bears at one end a lever 180 with a knife 182 that can be swung between the two separated displacement implements 54a, 54b in order to sever the constricted and stretched sausage string. Power for the knife 182 is provided by a lever 184 that sits on the other end of shaft 178, to which lever 184 is connected a power cylinder 186 moveably attached by its housing to support plate 36.

As FIG. 1 shows, control shaft 104 extends beyond the cam wheels 130, 132 and bears five radial cams 190, 192, 194, 196, 198, which respectively actuate control valve 200, 202, 204, 206, 208 through each 180° rotation of control shaft 104. The control valves operate as follows:

Control valve 200 is actuated as soon as control pins 140, 142 reach the outer sections 210 of control grooves 136, 138 that are concentrically arranged in relation to control shaft 104, and cause power cylinder 156 at the displacement implement pair 54b to be actuated, whereby the fastening clip 26 that has been placed in front of the stamp at that point is placed on the constriction that has already been formed by the displacement implements 54a, 54b, but that has not yet been stretched.

Control valve 202 causes power cylinder 100 to be actuated, whereupon the latter causes the displacement implements 54a, 54b to separate from each other, whereby the constriction of the sausage string is stretched over the distance indicated by #24 of FIG. 1.

Before reaching the end of one of the sections 210 of control grooves 136, 138 that is arranged concentrically in relation to control shaft 104, control valve 204 is actuated and causes power cylinder 156 at the displacement implements to be actuated, whereby the fastening clip 28 is set in place.

Throughout the travel cycle of control pins 140, 142 through the concentric zones 210 of control grooves 136, 138, control valve 206 is actuated, which during this time frame causes the delivery of pressure fluid to the hydraulic motor 122 to be regulated, which slows the revolution of control shaft 104, in order to allow sufficient time for the three previously described phases to occur, and prevents their temporal overlapping.

Finally, control valve 208 is actuated immediately after the second fastening clip 28 is set in place and initiates with the aid of power cylinder 186 the severing movement of the knife 182.

For presentation reasons, control valves 200–208 in FIG. 1 are represented as being situated below radial cams 190-198 when in fact they are turned at an angle of 90° to control shaft 104 beside radial cams 190-198 and are arranged on a support member that is fixed to support plate 36. It is plausible to envisage a suitable covering for the radial cams 190-198 and control valves 200-208 in order to shield these elements from the soiling that necessarily accompanies operation. This covering can be made to support rollers 212 that transport the severed sausages 22 and feed them into a (not shown) receptacle.

The described device operates in the following manner:

It is assumed that device 20 occupies the open position shown in FIG. 2, in which a chain of tubes 14 lies inside prism 48, 50. When power cylinder 40 is extended, support plate 36 and its attached elements including magazine 42 are displaced to the right in relation to the position shown in FIG. 2 into the position indicated in FIG. 1, whereby the filling pipe 12 loads itself with the chain of tubes sitting in prism 48, 50 and the closed leading end of this chain that is closed with a fastening clip 16 is drawn forward by casing brake 18.

During this procedure, displacement implements 54a, 54b are opened as shown in FIG. 5 and assume the unspread attitude shown in FIG. 7.

As soon as support plate 36 reaches its work position, automatic filling apparatus 10 and hydraulic motor 122 are turned on in series. After being switched on, automatic filling apparatus 10 pushes sausage filling through filling pipe 12 into the closed leading end of tube chain 14 and in order to produce a sausage string fills with sausage filling the sausage casing material that has been pulled away from the filling pipe by the casing brake 18 until the sausage length attains the length of an individual sausage.

When the automatic filling apparatus is switched on, electromotors 176 are also turned on, and friction belts 174 transport the rows of clips 168 until they reach the guides 162. At this point, power cylinder 166 extends, and the pushers 164 thereby actuated shove the foremost clips of both clip rows 168 through the channels 160 into guide paths 152 positioned underneath stamp 150, whereupon power cylinder 166 together with pushers 164 returns to its original position.

At this point, automatic filling apparatus 10 is shut off, hydraulic motor 122 cuts in and turns control shaft 104 one half turn or 180°.

While the control shaft revolves, the unspread displacement implements 54a, 54b first close and in the closing zone form a constriction 24 that is at first relatively short, which constriction spans the distance between the semicircular recesses 70, 72 shown in FIG. 6.

As control shaft 104 turns yet further, radial cam 190 first actuates control valve 200 for the hydraulic power cylinder 156 at displacement implement 54b and places the fastening clip 26 positioned by the thereby actuated stamp 150 at the front end of constriction 24. At the same time, radial cam 196 actuates control valve 206 and provides for a regulated feed of pressure fluid to the hydraulic motor 122 in order to slow its turning.

As control shaft 104 is turned further, radial cam 192 actuates control valve 202, which initiates the actuation of power cylinder 100, which swings the double-armed drive lever 92 and through pressure plate 86, guide rods 82 and blocks 78, 80, moves displacement implement pair 54b away from displacement implement pair 54a, whereby constriction 24 in the form shown in FIG. 1 is stretched.

Finally, with further turning of control shaft 104, radial cam 194 actuates control valve 204 and thereby causes the actuation of power cylinder 156 at displacement implement pair 54a, whereby the clip stamp 150 thus actuated places the positioned clip 28 at the rear end of the constriction 24.

The already mentioned operating phases initiated by radial cams 192, 194 and 196 are completely executed while control pins 140, 142 penetrate the concentric sections 210 of control grooves 236, 138, i.e. the displacement implements 54a, 54b are closed.

As control shaft 104 turns further, displacement implements 54a, 54b open, stamps 150 return to their original position, displacement implements 54a, 54b open and displacement implement 54b is moved by power cylinder 100 back into the position adjacent to displacement implement pair 54a. Thus can begin a filling phase when automatic filling apparatus 10 is switched on, and the previously described operation repeats according to the sequence described, until the casing tube material sitting on filling pipe 12 is consumed. At this point, power cylinder 40 cuts in and again pushes support plate 36 with all of the elements thereto attached into the release position shown in FIG. 2, wherein power cylinder 52 is actuated and a new chain of tubes 14 is placed in prism 48, 50. Thus, the device returns to its starting position, and the entire operating sequence resumes.

The invention is not limited to placing the fastening clip 26 prior to the extension of constriction 24. It is clear that constriction 24 can be stretched first, whereupon both fastening clips 26, 28 can be set in place at the same time. The preliminary placing of fastening clip 26, however, has the advantage that, during the stretching of constriction 24, the sausage filling thus displaced is not transferred into sausage 22, but rather a corresponding amount of casing tube material is drawn away from filling pipe 12.

The sausage string produced according to the above-described process can remain undivided. Although cylinder 186 is actuated synchronously with the placing of fastening clip 28, constriction 24 can, after each sectioning procedure, be severed with the aid of a knife 182, so that individual sausages can be transported over the rollers 212 to the (not shown) receptacles.

The embodiments of the invention in which an exclusive property or privilege is claimed are defined as follows:

1. An apparatus for sectioning an axial string of sausages comprising:
    a casing brake located about a filling pipe from which a casing tube is intermittently drawn and filled;
    a rear displacement implement and a forward displacement implement with which the axially fed filled casing tube is intermittently constricted;
    a displacement means for axially moving said displacement implements between a separated and an unseparated position; and
    a built-in rear clip magazine and a built-in forward clip magazine;
    wherein each said displacement implement includes
    (a) a pair of oppositely movable V-shaped constriction members,
    (b) a constriction moving means for moving said constriction members between a constricting position whereby the casing tube is constricted and a filling position whereby the casing tube is unconstricted such that when both said pairs of constriction members are in the constricting position the movement of said displacement implements from the unseparated to the separated positions creates a stretched constriction of the casing tube, and (c) a fastening device for fastening a clip about an adjacent constricted portion of the casing tube, said fastening device including a mould, a stamp cooperating with said mould, a channel into which a clip from a respective said magazine is fed at an angle to a sliding direction of said stamp, and a feeding means for feeding a clip from the respective said magazine through said channel and into a guide path of said stamp when said constriction members are in the filling position and said displacement implements are in the unseparated position.

2. An apparatus for sectioning an axial string of sausages as claimed in claim 1 wherein each said stamp and cooperating said mould are positioned at an angle to a radial plane of the sausage string such that overlapping shank ends of the clip are formed, which overlapping ends are disposed in radial planes of the sausage string.

3. An apparatus for sectioning an axial string of sausages as claimed in claim 1 wherein each said feeding means includes a built-in guide at an end of a respective said magazine in which a leading clip of a clip row is disposed and which is adjacent to a respective said channel when said constriction members are in the filling position and said displacement members are in the unseparated position, a pusher for pushing the leading clip from the guide and through said channel into the cooperating guide path, and a pusher moving means for selectively moving said pusher.

4. An apparatus for sectioning an axial string of sausages as claimed in claim 1 wherein each said fastening device includes a hydraulic power cylinder attached to a respective said displacement implement for moving a respective said stamp reciprocally along the respective said guide path.

5. An apparatus for sectioning an axial string of sausages as claimed in claim 1 wherein each said constriction moving means includes a cam wheel whose rotation causes respective said cooperating constriction members to move, said cam wheels being shaped to provide a dwell time when said constriction members are in the constricting position; and wherein said displacement means includes radial cams rigidly attached to said cam wheels which control the movement of said displacement implements and the actuation of said fastening devices including the actuation of said forward fastening device when said displacement implements are in the separated position.

6. An apparatus for sectioning an axial string of sausages as claimed in claim 5 wherein said displacement means includes a further radial cam rigidly attached to said cam wheels and a reduction means for reducing a turning speed of said cam wheels which is actuated by said further radial cam when said displacement implements are in the constricted position.

7. An apparatus for sectioning an axial string of sausages as claimed in claim 6 and further including a shaft upon which all said radial cams and said cam wheels are commonly disposed, and a motor means for turning said shaft 180° after each filling.

8. An apparatus for sectioning an axial string of sausages as claimed in claim 7 wherein said cam wheels are formed by opposed circular discs having cooperating guide grooves disposed on facing sides of said discs, and further including respective control pins received in said grooves and spanning a distance between said discs which drive a respective pair of constriction members.

9. An apparatus for sectioning an axial string of sausages as claimed in claim 8 wherein both constriction members of one said displacement implement are rigidly attached to said control pins and both constriction members of the other said displacement implement are mounted on said control pins for axial sliding movement therealong; and further including a controllable spreading means mounted to the other said displacement implement for sliding said constriction members of the other said displacement implement.

10. An apparatus for sectioning an axial string of sausages as claimed in claim 8 wherein said spreading means includes a double-acting hydraulic power cylinder.

11. An apparatus for sectioning an axial string of sausages as claimed in claim 1 and further including:

a frame upon which said casing brake, said displacement implements and said displacement means are located;

a drive means for driving said frame between a work position where said casing brake fits over the filling pipe and on which said displacement implements are arranged directly in front of a mouth of the filling pipe to a clear position where said casing brake and said displacement implements are clear of the filling pipe;

a tube magazine for holding a plurality of casing tubes; and a holding device which receives a casing tube from said tube magazine each time said frame is moved to the clear position, said holding device being attached to said frame such that as said frame is moved from the clear position to the work position the filling pipe passes through the casing tube in said holding device to load the casing tube on the filling pipe.

12. A method for sectioning an axial string of sausages produced on an automatic filling device into a number of separable sausages comprising the steps of:

disposing rear and forward fastening implements on respective rear and forward displacement implements of the filling device;

intermittently filling sausage casing tubing mounted about a filling pipe and drawn from a casing brake;

during said filling step, separating a rear clip and a forward clip from respective rear and forward clip supplies built in to the device and placing the clips adjacent the respective fastening implements at an angle such that the ends of each clip are on opposite sides of a radial plane of the string;

during a filling pause, constricting the casing tube immediately in front of a mouth of the filling pipe with the displacement elements along a narrowly bordered length of the casing tube, and axially spreading the displacement implements to stretch the constriction to form a rear constriction portion and a forward constriction portion with a division point therebetween; and wherein closing the rear and forward constriction portions is effected by setting of the respective rear and forward clips thereabout by the respective fastening implements during the filling pause.

13. A method for sectioning an axial string of sausages as claimed in claim 12 wherein the closing of the rear constriction portion by setting of the rear clip occurs before said spreading step; wherein said spreading step includes the moving of the rear displacement implement and the rear fastening implement attached thereto away from the filling pipe while the forward displacement implement and forward fastening implement attached thereto are stationary; and wherein the closing of the forward constriction portion occurs after said spreading step.

14. A method for sectioning an axial string of sausages as claimed in claim 12 wherein said setting step includes the orienting of the rear clip on the rear constriction portion such that shank ends of the rear clip overlap.

15. A method for sectioning an axial string of sausages as claimed in claim 14 wherein the orienting step further orients the overlapping portions of the shank ends to lie in radial planes of the string.

16. A method for sectioning an axial string of sausages as claimed in claim 12 wherein the filling device further includes an automatic supply of new casing tubes such that after a casing tube drawn from the filling pipe is consumed, the method further comprises the steps of:
   bringing the displacement elements and casing brake together from a work position to a position where the filling pipe is freed,
   automatically moving a new casing tube into position in front of the mouth of the filling pipe, and
   sliding the new casing tube onto the filling pipe by returning the displacement implements and casing brake to the work position.

* * * * *